(12) United States Patent
Jacobs

(10) Patent No.: US 6,356,461 B1
(45) Date of Patent: Mar. 12, 2002

(54) TRANSFORMER FLUX OBSERVER FOR A FULL BRIDGE POWER CONVERTER AND METHOD OF OPERATION THEREOF

(76) Inventor: Mark E. Jacobs, 7615 Applecross La., Dallas, TX (US) 75248

(*) Notice: Subject to any disclaimer, the term of this patent is extended or adjusted under 35 U.S.C. 154(b) by 0 days.

(21) Appl. No.: 09/589,970

(22) Filed: Jun. 8, 2000

(51) Int. Cl.$^7$ .............................................. H02M 3/335
(52) U.S. Cl. ........................................ 363/17; 363/132
(58) Field of Search ............................. 363/17, 16, 95, 363/98, 131, 132

(56) References Cited

U.S. PATENT DOCUMENTS

| | | | | |
|---|---|---|---|---|
| 4,748,550 A | * | 5/1988 | Okado ........................... | 363/98 |
| 4,785,387 A | * | 11/1988 | Lee et al. ...................... | 363/21 |
| 4,916,599 A | * | 4/1990 | Traxler et al. ................. | 363/65 |
| 5,065,301 A | * | 11/1991 | Shioya et al. .................. | 363/17 |
| 5,917,711 A | * | 6/1999 | Shikata et al. ................. | 363/16 |

OTHER PUBLICATIONS

U.S. Patent Application Serial No. 09/374,217, filed Aug. 13, 1999, by Jeffrey J. Boylan, et al., entitled "System and Method for Determining Output Current and Converter Employing the Same".

"A High Power Density, High Efficiency and Fast Transient Voltage Regulator Module with a Novel Current Sensing an Current Sharing Technique" by Xunwei Zhou, Xu Peng and Fred C. Lee; 1999 IEEE; 6 pg.

"The Art of Electronics" Cambridge University Press, Second Edition; 1990; by Paul Horowitz and Winfield Hill; pp. 88–89.

"The Art of Electronics" Cambridge University Press, Second Edition; 1990; by Paul Horowitz and Winfield Hill; pp. 180–182.

"Linear Integrated circuits" by D. Roy Choudhury and Shail Jain; 1991; pp. 159–161.

* cited by examiner

*Primary Examiner*—Adolf Deneke Berhane

(57) ABSTRACT

A system and method for estimating magnetic flux in an isolation transformer and a power converter employing the system or the method. The power converter has a full bridge switching circuit coupled across a primary winding of an isolation transformer. In one embodiment, the system includes a conductive path, including an observer, established across at least a portion of the primary winding. A voltage developed by the observer depends upon a value of the magnetic flux in at least the portion of the primary winding.

20 Claims, 3 Drawing Sheets

TRANSFORMER FLUX OBSERVER FOR A FULL BRIDGE POWER CONVERTER AND METHOD OF OPERATION THEREOF

TECHNICAL FIELD OF THE INVENTION

The present invention is directed, in general, to power conversion and, more specifically, to a system and method for estimating magnetic flux in an isolation transformer and a power converter employing the system or the method.

BACKGROUND OF THE INVENTION

A power converter is a power processing circuit that converts an input voltage waveform into a specified output voltage waveform. Power converters are typically employed in applications that require conversion of an input DC voltage to various other DC voltages, higher or lower than the input DC voltage. Examples include telecommunication and computer systems wherein high voltages are converted to lower voltages to operate the systems.

Current power converter designs often implement one of two full bridge control strategies, namely, the conventional (hard-switched) full bridge or the phase-shifted full bridge. Both control strategies employ a full bridge inverter topology having four controllable switches (e.g., power metal-oxide semiconductor field-effect transistors), an isolation transformer, an output rectifier and an output filter. A controller is included and employed to control the controllable switches.

The conventional full bridge generally operates as follows. The controllable switches are arranged in two diagonal pairs that are alternately turned on for a portion of a switching period to apply opposite polarities of the input DC voltage across a primary winding of the isolation transformer. The controllable switches thus operate to convert the input DC voltage into an AC voltage required to operate the isolation transformer. Between conduction intervals of the diagonal pairs, all of the controllable switches are turned off for a fraction of the switching period. Ideally, this should force a voltage across the primary winding of the isolation transformer to zero. The output rectifier then rectifies the AC voltage from the isolation transformer. A rectified voltage of the isolation transformer should, therefore, ideally be a square wave with an average value proportional to a duty ratio of the diagonal pairs of controllable switches.

The output filter smooths and filters the rectified voltage to provide a substantially constant output voltage at the output of the power converter. The controller monitors the output voltage and adjusts the duty ratio of the diagonal pairs of controllable switches to maintain the output voltage at a constant level as the input DC voltage and the load current vary.

The conventional full bridge suffers from a ringing between a leakage inductance of the isolation transformer and a parasitic capacitance of the controllable switches. The ringing dissipates energy, thereby reducing the efficiency of the power converter. The ringing also gives rise to significant noise, such as conducted and radiated electromagnetic interference.

The phase-shifted full bridge was developed to alleviate the switching loss and switching noise problems of the conventional full bridge. The construction of the phase-shifted full bridge is essentially identical to that of the conventional full bridge. Its advantages result, however, from the operation of the controllable switches to produce a zero voltage across the controllable switches before the controllable switches are turned on. The phase-shifted full bridge operates by turning off only one controllable switch of a diagonal pair to begin the zero voltage period, instead of turning off both of the controllable switches. A controllable switch from the alternate pair is then turned on, allowing the current in the primary circuit to circulate through the two controllable switches with substantially zero volts across the isolation transformer. The two controllable switches thus clamp the voltage across the isolation transformer at about zero, thereby substantially eliminating the ringing behavior suffered by the conventional full bridge when the controllable switches are off.

The magnetic flux in the isolation transformer should be sensed and controlled in both the conventional and the phase-shifted full bridge. A small imbalance in the duty cycles of the controllable switches or a small asymmetry in voltage drops across the controllable switches can result a volt-second imbalance between the two half-cycles of each switching cycle, which will result in a continuing cycle by cycle increase in the magnetic flux in the isolation transformer. A volt-second imbalance implies that a DC voltage component is applied to the core of the isolation transformer. Over a number of switching cycles, the increase in the magnetic flux may cause the core of the isolation transformer to saturate, resulting in failure of the power converter employing the isolation transformer.

A volt-second imbalance between the two half-cycles of each switching cycle is thus detrimental to the operation of the power converter. There are several causes of the volt-second imbalance, including an imbalance in the duty cycles of the controllable switches or a small asymmetry in the voltage drops across the controllable switches. Over a number of switching cycles, the continuing increase in the magnetic flux may cause the core of the isolation transformer to saturate. It is therefore necessary to estimate the magnetic flux in the isolation transformer and reduce the volt-second imbalance to avoid saturation of the core.

One common approach to estimating the magnetic flux in the isolation transformer is to employ a current sense transformer to directly sense the current in the primary winding of the isolation transformer. The controller may then operate the controllable switches to reduce the volt-second imbalance. Since ordinary (non-superconducting) transformers are unable to sense the DC voltage component, the above approach often requires two current sense transformers, each sensing either a positive or a negative current. Substantial expense and board real estate are thus required with the current sense transformer approach. Further, the current sense transformers will introduce a small parasitic inductance into the circuit that, when subjected to the rapid switching action of the controllable switches, may result in voltage transients and may necessitate the use of additional snubber circuitry.

Another common approach to estimating the magnetic flux in the isolation transformer is to employ a resistor series-coupled to the primary winding of the isolation transformer. A sensing circuit may then be employed to sense a voltage across the resistor to determine the current in the primary winding. The resistor, however, may dissipate a substantial amount of energy (especially in higher power applications), thereby reducing the efficiency of the power converter employing this approach.

Accordingly, what is needed in the art is a system and method for estimating magnetic flux in the isolation transformer that overcomes the deficiencies of the prior art.

SUMMARY OF THE INVENTION

To address the above-discussed deficiencies of the prior art, the present invention provides, for use with a power converter having a full bridge switching circuit coupled across a primary winding of an isolation transformer, a system and method for estimating magnetic flux in the isolation transformer and a power converter employing the system or the method. In one embodiment, the system includes a conductive path, including an observer, established across at least a portion of the primary winding. A voltage developed by the observer depends upon a value of the magnetic flux in at least the portion of the primary winding.

The present invention, in one aspect, provides a system and method for estimating magnetic flux in an isolation transformer of a full bridge switching circuit. By estimating the magnetic flux in the isolation transformer, the controllable switches of the full bridge switching circuit may be adjusted to reduce a volt-second imbalance in the two half-cycles of each switching cycle, thereby avoiding failure of the power converter due to saturation of a core of the isolation transformer.

In one embodiment of the present invention, the magnetic flux is estimable without the use of a current sense transformer. As previously discussed, current sense transformers are often used in pairs and therefore may require substantial expense and board real estate. Additionally, the magnetic flux may also be estimable without the use of a resistor series-coupled to the primary winding of the isolation transformer. As previously discussed, the series-coupled resistor may dissipate a substantial amount of energy thereacross, thereby reducing the efficiency of the power converter.

In one embodiment of the present invention, the observer includes a series-coupled sense capacitor and sense resistor. The magnetic flux in the primary winding may be estimated by measuring a voltage across the capacitor. In an alternative embodiment, the observer includes a series-coupled sense resistor and sense inductor. The magnetic flux in the primary winding may be estimated by measuring a voltage across the resistor. In either case, the observer allows the magnetic flux in the primary winding to be estimated and controlled.

In one embodiment of the present invention, the full bridge switching circuit is operable in a phase-shifted mode. In another embodiment, the full bridge switching circuit is operable in a conventional or hard-switched mode. Those skilled in the art are familiar with both the phase-shifted and hard-switched modes of operating the full bridge switching circuit.

In one embodiment of the present invention, the power converter employs the system to reduce an imbalance of the magnetic flux in the isolation transformer. Saturation of the isolation transformer and resultant failure of the power converter may thus be avoided.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
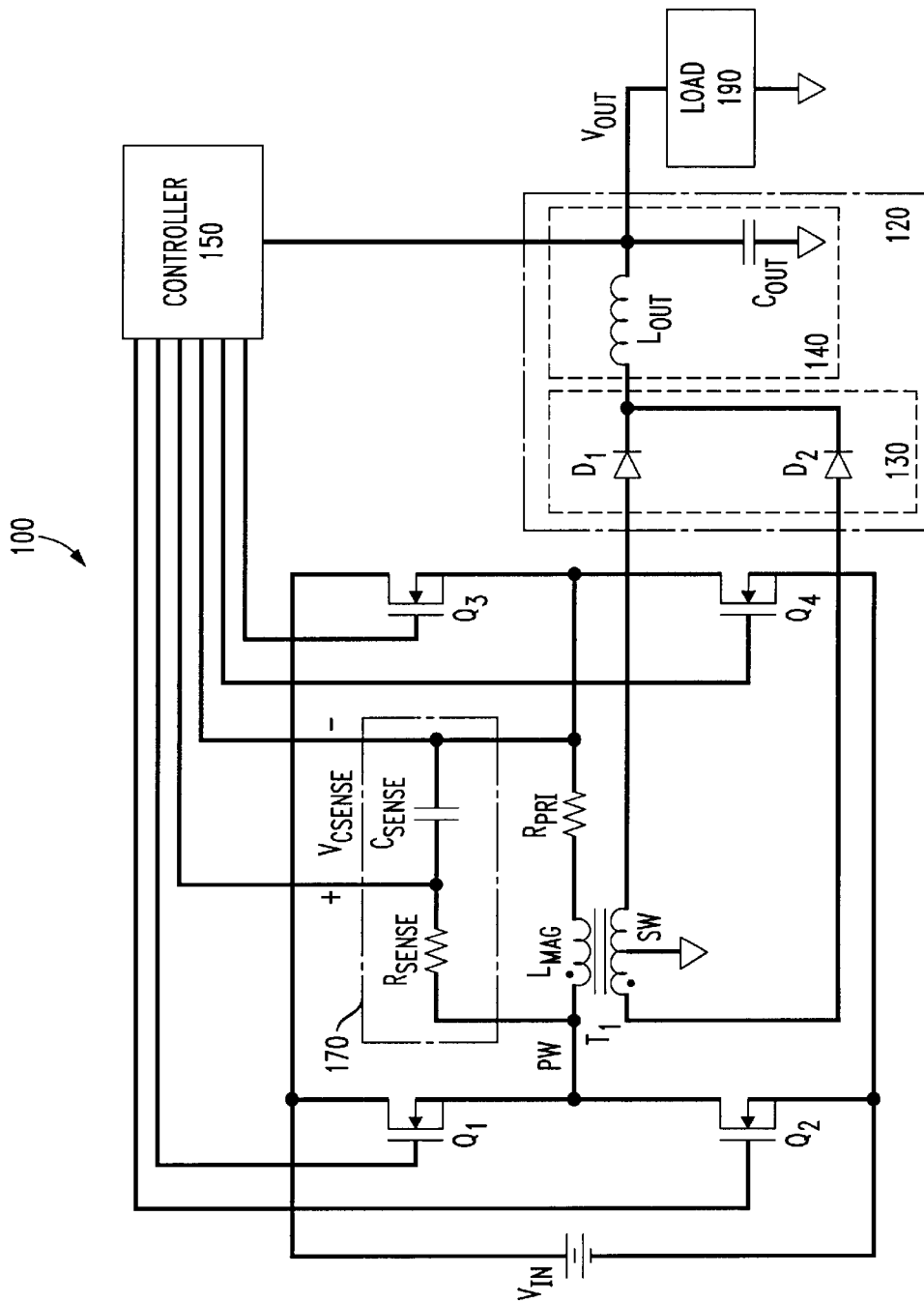
FIG. 1 illustrates a schematic diagram of an embodiment of a power converter constructed in accordance with the principles of the present invention.

Referring initially to FIG. 1, illustrated is a schematic diagram of an embodiment of a power converter 100 constructed in accordance with the principles of the present invention. The power converter 100 includes a full bridge switching circuit, having first, second, third and fourth controllable switches $Q_1$, $Q_2$, $Q_3$, $Q_4$, coupled across a primary winding PW of an isolation transformer $T_1$. The first, second, third and fourth controllable switches $Q_1$, $Q_2$, $Q_3$, $Q_4$ are intermittently switched to apply a DC input voltage $V_{IN}$ across the primary winding PW. The switching circuit may be operated in a hard-switched mode or in a phase-shifted mode. Those skilled in the art are familiar with the various modes of operating the switching circuit.

The power converter 100 further includes an output stage 120 coupled across a secondary winding SW of the isolation transformer $T_1$. The output stage 120 includes a rectifier 130, coupled to the secondary winding SW, and an output filter 140 coupled to the rectifier 130. The rectifier 130 receives a periodic waveform from the secondary winding SW and rectifies the periodic waveform for delivery to the output filter 140. In the illustrated embodiment, the rectifier 130 is arranged in a center-tapped full-wave rectifying topology and includes first and second rectifying diodes $D_1$, $D_2$. Of course, other rectifier topologies, including those employing synchronous rectifiers, are well within the broad scope of the present invention.

The output filter 140 filters the rectified waveform from the rectifier 130 to supply an output voltage $V_{OUT}$ to a load 190 at an output of the power converter 100. While the illustrated embodiment of the output filter 140 includes an output inductor $L_{OUT}$ and an output capacitor $C_{OUT}$, other output filter topologies are well within the broad scope of the present invention.

The power further includes a controller 150, coupled to the switching circuit, that monitors the output voltage $V_{OUT}$ and adjusts the duty cycles of the first, second, third and fourth controllable switches Q1, Q2, Q3, Q4 to regulate the output voltage $V_{OUT}$.

A core of the isolation transformer $T_1$ is subject to saturation due to an imbalance of magnetic flux therein resulting from, among other things, inaccuracies in the first, second, third and fourth controllable switches Q1, Q2, Q3, Q4 of the switching circuit. The power converter 100, therefore, advantageously includes a system for estimating the magnetic flux in the isolation transformer $T_1$. The controller 140 may thus operate the first, second, third and fourth controllable switches $Q_1$, $Q_2$, $Q_3$, $Q_4$ of the switching circuit to reduce the imbalance of magnetic flux and thereby prevent saturation of the core of the isolation transformer $T_1$.

In the illustrated embodiment, the system includes a conductive path, established across at least a portion of the primary winding PW. The conductive path includes an observer 170 that develops a voltage that depends upon a value of the magnetic flux in at least the portion of the primary winding PW. The observer 170, in the illustrated embodiment, includes a series-coupled sense capacitor $C_{SENSE}$ and sense resistor $R_{SENSE}$. The parameter $L_{MAG}$ represents a magnetizing inductance of the transformer T1 with respect to the primary winding PW. The primary winding PW further has a winding resistance (parasitic resistance of the primary winding) represented by the parameter $R_{PRI}$. By selecting values of the sense capacitor $C_{SENSE}$ and sense resistor $R_{SENSE}$ such that the equation $$R_{SENSE} C_{SENSE} \cdot L_{MAG}/R_{PRI}$$

is roughly satisfied, a sense capacitor voltage $V_{CSENSE}$ across the sense capacitor CSENSE will represent, with sufficient accuracy, a time-varying magnetic flux $\Phi$ in the isolation transformer $T_1$. The magnetic flux $\Phi$ may thus be estimated in accordance with the following equation:

$$\Phi = V_{CSENSE} \cdot R_{SENSE} \cdot C_{SENSE}/N_{PRI}$$

wherein $N_{PRI}$ is the number of turns in the primary winding PW of the isolation transformer $T_1$. Thus by locating the observer 170 across at least a portion of the primary winding PW and measuring the sense capacitor voltage $V_{CSENSE}$ across the sense capacitor $C_{SENSE}$, the magnetic flux $\Phi$ in the primary winding PW of the isolation transformer $T_1$ may be estimated.

Figure 2:
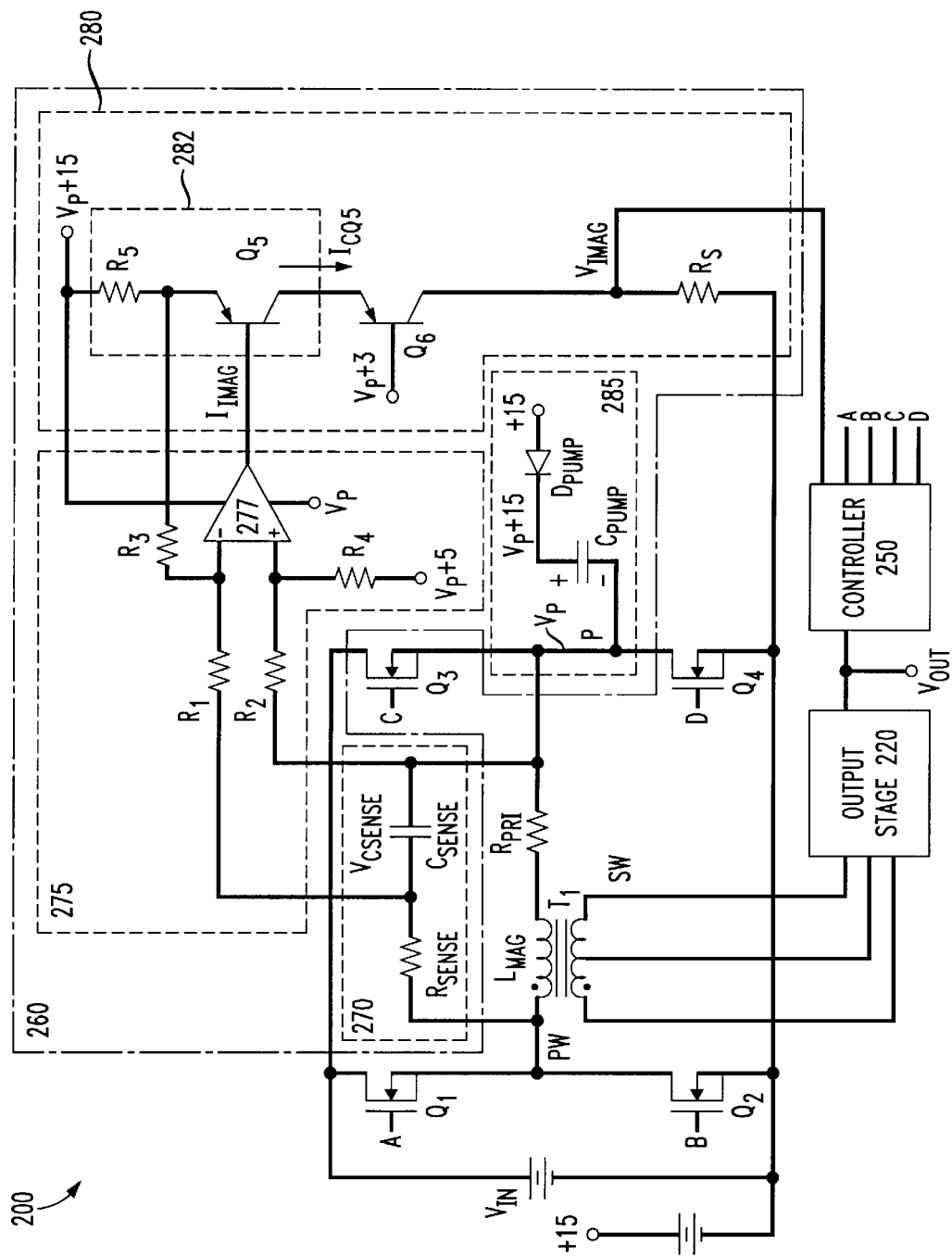
FIG. 2 illustrates a schematic diagram of another embodiment of a power converter constructed in accordance with the principles of the present invention.

Turning now to FIG. 2, illustrated is a schematic diagram of another embodiment of a power converter 200 constructed in accordance with the principles of the present invention. The power converter 200 includes a full bridge switching circuit, having first, second, third and fourth controllable switches $Q_1$, $Q_2$, $Q_3$, $Q_4$, coupled across a primary winding PW of an isolation transformer $T_1$. The first, second, third and fourth controllable switches $Q_1$, $Q_2$, $Q_3$, $Q_4$ are intermittently switched to apply a DC input voltage VIN across the primary winding PW. The power converter 200 further includes an output stage 220, coupled to a secondary winding SW of the isolation transformer $T_1$, that processes power received therefrom to develop an output voltage $V_{OUT}$ at an output of the power converter 200. The output stage 220 may be analogous to the output stage 120 illustrated and described with respect to FIG. 1. Alternatively, other output stage topologies may be employed and still be well within the broad scope of the present invention.

The power converter 200 further includes a controller 250, coupled to the switching circuit, that monitors the output voltage $V_{OUT}$ and adjusts the duty cycles of the first, second, third and fourth controllable switches Q1, Q2, Q3, Q4 to regulate the output voltage $V_{OUT}$. In the illustrated embodiment, the controller 250 develops first, second, third and fourth drive signals A, B, C, D to drive the first, second, third and fourth controllable switches Q1, Q2, Q3, Q4, respectively.

The power converter 200 still further includes a system 260 for estimating magnetic flux in the isolation transformer. In the illustrated embodiment, the system 260 includes a conductive path, established across the primary winding PW. The conductive path includes an observer 270 having a series-coupled sense capacitor $C_{SENSE}$ and sense resistor $R_{SENSE}$. A sense capacitor voltage $V_{CSENSE}$ developed across the sense capacitor $C_{SENSE}$ depends upon a value of the magnetic flux in the primary winding PW of the isolation transformer $T_1$.

The system further includes an amplifier circuit 275 coupled to the observer 270. In the illustrated embodiment, the amplifier circuit 275 includes an operational amplifier 277 and associated circuitry (first, second, third and fourth resistors $R_1$, $R_2$, $R_3$, $R_4$). The amplifier circuit 275 receives the sense capacitor voltage $V_{CSENSE}$ and develops therefrom a magnetizing current signal $I_{MAG}$ indicative of the magnetizing current in the primary winding PW of the isolation transformer $T_1$.

Due to the switching action of the first, second, third and fourth controllable switches Q1, Q2, Q3, Q4, a ground reference P of the operational amplifier 277 (having a ground reference voltage $v_p$) is alternately coupled between ground and substantially the input voltage $V_{IN}$. The system 260, therefore, further includes a representative ground reference circuit 280 that references the magnetizing current signal $I_{MAG}$ to ground. In the illustrated embodiment, the ground reference circuit 280 includes a transconductance amplifier 282 having a transconductance transistor Q5 and a resistor R5. The transconductance amplifier 282 receives and converts the magnetizing current signal $I_{MAG}$ to a current source, producing a collector current $I_{CQ5}$ (through the transconductance transistor Q5) having a component proportional to the sense capacitor voltage $V_{CSENSE}$ across the sense capacitor $C_{SENSE}$.

The ground reference circuit 280 further includes a cascode transistor Q6 configured, in the illustrated embodiment, as a grounded-base amplifier. The cascode transistor Q6 provides further isolation of transient currents induced through the parasitic capacitances of the transistor Q5 by the switching action of the first, second, third and fourth controllable switches Q1, Q2, Q3, Q4.

The ground reference circuit 280 still further includes a resistor $R_S$, coupled to the cascode transistor Q6, that converts the collector current $I_{CQ5}$ to a voltage $V_{IMAG}$ representative of the magnetizing current $I_{MAG}$ through the primary winding. The magnetic flux in the isolation transformer $T_1$ may then be estimated in accordance with the following equation:

$$\Phi \approx V_{IMAG} \cdot R_S/R_S \cdot R_1/R_3 \cdot (R_{SENSE} \cdot C_{SENSE}/N_{PRI})$$

Other circuit arrangements for employing the output of the operational amplifier 277 are possible and can be readily devised, including additional control circuitry referenced to the ground reference point $V_p$, rather than circuit ground. The magnetic flux in the isolation transformer $T_1$ may thus be estimated, allowing the controller 250 to operate the switching circuit to reduce the imbalance of magnetic flux and thereby prevent saturation of the isolation transformer $T_1$.

Figure 3A:
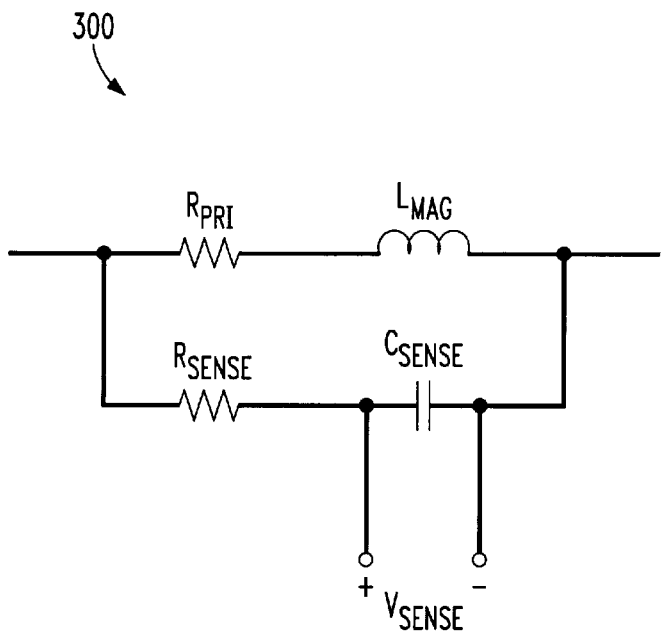
FIGS. 3A and 3B illustrate schematic diagrams of embodiments of an observer constructed in accordance with the principles of the present invention.
Figure 3B:
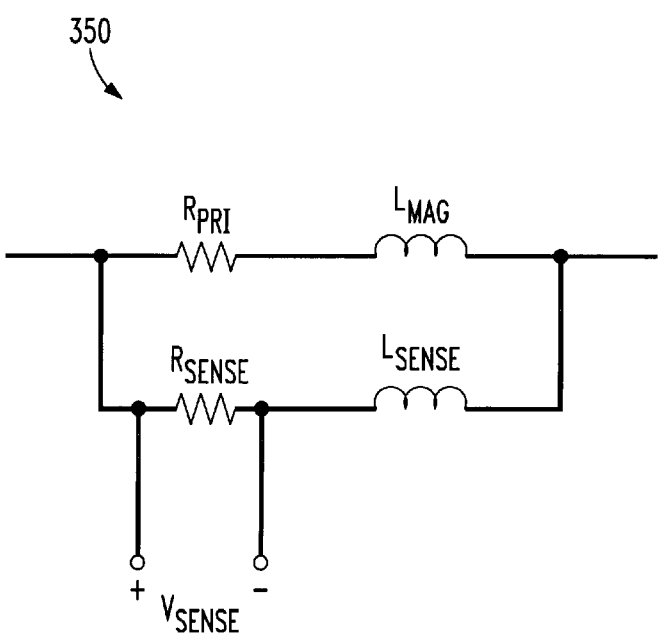

Turning now to FIGS. 3A and 3B, illustrated are schematic diagrams of embodiments of an observer constructed in accordance with the principles of the present invention. More specifically, FIG. 3A illustrates a first observer 300. The first observer 300 is parallel-coupled across a primary winding PW of an isolation transformer T1 and includes a series-coupled sense capacitor $C_{SENSE}$ and sense resistor $R_{SENSE}$. A sense capacitor voltage $V_{SENSE}$ developed across the sense capacitor $C_{SENSE}$ depends upon a value of the magnetic flux in the primary winding PW of the isolation transformer $T_1$ and the number of turns in the primary winding $N_{PRI}$. The magnetic flux in the primary winding PW may be estimated in accordance with the following equation:

$$\Phi \approx (V_{SENSE} \cdot R_{SENSE} \cdot C_{SENSE})/N_{PRI}$$

The magnetic flux may, therefore, be estimated by measuring the sense capacitor voltage $V_{SENSE}$ across the sense capacitor $C_{SENSE}$.

Turning now to FIG. 3B, illustrated is a second observer 350 constructed in accordance with the principles of the present invention. Analogous to the first observer 300, the second observer 350 is also parallel-coupled across the primary winding PW of the isolation transformer T1 and may be employed to estimate the magnetic flux in the primary winding PW of the isolation transformer $T_1$. The second observer 350 includes a series-coupled sense resistor $R_{SENSE}$ and sense inductor $L_{SENSE}$. A sense resistor voltage $V_{SENSE}$ developed across the sense resistor $R_{SENSE}$ depends upon a value of the magnetic flux in the primary winding PW of the isolation transformer $T_1$. The magnetic flux in the primary winding PW may be estimated in accordance with the following equation.

$$\Phi \approx (V_{SENSE} \cdot L_{SENSE})/(N_{PRI} \cdot R_{SENSE})$$

The magnetic flux may, therefore, be estimated by measuring the sense resistor voltage $V_{SENSE}$ across the senses resistor $R_{SENSE}$. Those skilled in the art will realize that the first and second observers 300, 350 are submitted for illustrative purposes only and that other observers capable of developing a voltage that depends upon a value of the magnetic flux in the isolation transformer of a power converter are well within the broad scope of the present invention.

Those skilled in the art should understand that the previously described embodiments of the system and method for estimating magnetic flux in an isolation transformer of a power converter are submitted for illustrative purposes only and that other embodiments capable of providing an estimate of the magnetic flux are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. For a better understanding of power converters, see *Modern DC-to-DC Switchmode Power Converter Circuits*, by Rudolph P. Severns and Gordon Bloom, Van Nostrand Reinhold Company, New York, N.Y. (1985) and *Principles of Solid-State Power conversion*, by Ralph E. Tarter, Howard W. Sam & Co., Inc., Indianapolis, Ind. (1985), which are incorporated herein by reference in their entirety.

Although the present invention has been described in detail, those skilled in the art should understand that they can make various changes, substitutions and alterations herein without departing from the spirit and scope of the invention in its broadest form.

What is claimed is:

1. For use with a power converter having a full bridge switching circuit coupled across a primary winding of an isolation transformer, a system for estimating magnetic flux in said isolation transformer, comprising:
   a conductive path, established across at least a portion of said primary winding, that includes an observer, a voltage developed by said observer depending upon a value of said magnetic flux in said at least said portion and employable to operate a switch of said full bridge switching circuit to thereby prevent a saturation of said isolation transformer.

2. The system as recited in claim 1 wherein said magnetic flux is estimable without use of a current sense transformer.

3. The system as recited in claim 1 wherein said observer comprises a series-coupled sense capacitor and sense resistor.

4. The system as recited in claim 1 wherein said observer comprises a series-coupled sense resistor and sense inductor.

5. The system as recited in claim 1 wherein said full bridge switching circuit is operable in a phase-shifted mode.

6. The system as recited in claim 1 wherein said full bridge switching circuit is operable in a hard-switched mode.

7. The system as recited in claim 1 wherein said power converter employs said system to reduce an imbalance of said magnetic flux in said isolation transformer thereby preventing saturation of said isolation transformer.

8. For use with a power converter having a full bridge switching circuit coupled across a primary winding of an isolation transformer, a method for estimating magnetic flux in said isolation transformer, comprising:
   establishing a conductive path, including an observer, across at least a portion of said primary winding; and
   developing, with said observer, a voltage indicative of a value of said magnetic flux in said at least said portion employable to operate a switch of said full bridge switching circuit to thereby prevent a saturation of said isolation transformer.

9. The method as recited in claim 8 wherein said magnetic flux is estimable without use of a current sense transformer.

10. The method as recited in claim 8 wherein said observer comprises a series-coupled sense capacitor and sense resistor.

11. The method as recited in claim 8 wherein said observer comprises a series-coupled sense resistor and sense inductor.

12. The method as recited in claim 8 further comprising operating said full bridge switching circuit in a phase-shifted mode.

13. The method as recited in claim 8 further comprising operating said full bridge switching circuit in a hard-switched mode.

14. The method as recited in claim 8 further comprising reducing an imbalance of said magnetic flux thereby preventing saturation of said isolation transformer.

15. A power converter, comprising:
   a full bridge switching circuit coupled across a primary winding of an isolation transformer, said isolation transformer subject to saturation due to an imbalance of magnetic flux therein;
   a system for estimating magnetic flux in said isolation transformer, comprising:
      a conductive path, established across at least a portion of said primary winding, that includes an observer, a voltage developed by said observer depending upon a value of said magnetic flux in said at least said portion; and
   a controller that operates said full bridge switching circuit based on said voltage to reduce said imbalance and thereby prevent said saturation.

16. The power converter as recited in claim 15 wherein said magnetic flux is estimable without use of a current sense transformer.

17. The power converter as recited in claim 15 wherein said observer comprises a series-coupled sense capacitor and sense resistor.

18. The power converter as recited in claim 15 wherein said observer comprises a series-coupled sense resistor and sense inductor.

19. The power converter as recited in claim 15 wherein said full bridge switching circuit is operable in a phase-shifted mode.

20. The power converter as recited in claim 15 wherein said full bridge switching circuit is operable in a hard-switched mode.

* * * * *